March 17, 1953

R. L. EVANS 2,632,081

ARC WELDING APPARATUS

Filed Sept. 15, 1950

INVENTOR
R. L. EVANS
BY E. H. Kane
ATTORNEY

March 17, 1953  R. L. EVANS  2,632,081
ARC WELDING APPARATUS
Filed Sept. 15, 1950  3 Sheets-Sheet 3

INVENTOR
R. L. EVANS
BY  E. F. Kane
ATTORNEY

UNITED STATES PATENT OFFICE 2,632,081

ARC WELDING APPARATUS

Robert L. Evans, Indianapolis, Ind., assignor to Western Electric Company, Incorporated, New York, N. Y., a corporation of New York Application September 15, 1950, Serial No. 185,085

11 Claims. (Cl. 219—8)

This invention relates to arc welding apparatus and more particularly to an inert arc welding apparatus having a mechanism for advancing parts to be welded relative to an electrode and for reciprocating the electrode across the line of juncture of the parts as they are advanced during the welding operation.

In one method of welding aluminum, the aluminum parts to be welded together and a nonconsumable electrode are connected into an alternating current welding circuit, and the electrode mounted in a holder is manually moved across the juncture of the parts to establish an arc between the parts and the electrode to fuse the parts and form pools of molten metal thereon which unite to bond the parts together. The arc is blanketed in an inert gas such as argon or helium which is flowed therearound and during one-half of each cycle of alternating current the flow of electrons emitted from the electrode serve to heat the aluminum part, and during the other half of the cycle, when the electrons are emitted from the part, the oxide film on the pool of molten metal on the part is removed permitting the pools of molten metal contacting each other on adjacent parts to readily unite and form a weld.

In starting such a welding operation it is essential that the electrode be moved into a position in close proximity to one part and an arc established therebetween to fuse the part and form a pool of molten metal thereon, and then that the electrode be moved into a position in close proximity to the other part and an arc established therebetween to fuse the part and form a pool of molten metal thereon so that the pools of molten metal on adjacent parts may unite to bond the parts together. It is also desirable to reciprocate the electrode across the juncture of the parts during the entire welding operation to insure that an arc will be drawn from each part to cause the formation of molten pools of metal thereon and the welding of the parts together even though the parts may be separated slightly from each other at various places along the line of juncture of the parts.

It is an object of the present invention to provide a new and improved welding apparatus.

In accordance with one embodiment of the invention, two circular parts to be welded together at their edges are clamped together in a holder which is mounted for rotation in the welding apparatus and is electrically connected to an alternating current welding circuit, and an electrode also electrically connected in the welding circuit is mounted for axial reciprocation adjacent to and transversely of the path of movement of the edges of the parts. A drive is provided for rotating the parts relative to the electrode and for reciprocating the electrode across the line of juncture of the parts to insure that the arc formed between the electrode and the parts is moved alternately from one to the other of the parts.

Other objects and advantages of the invention will become apparent by reference to the following detailed description thereof and the drawings illustrating a preferred embodiment thereof, in which Fig. 1 is a front elevational view of the welding apparatus with parts in section and showing a cylindrical container and a cover plate therefor in position in the apparatus to be welded together;

Figure 1:
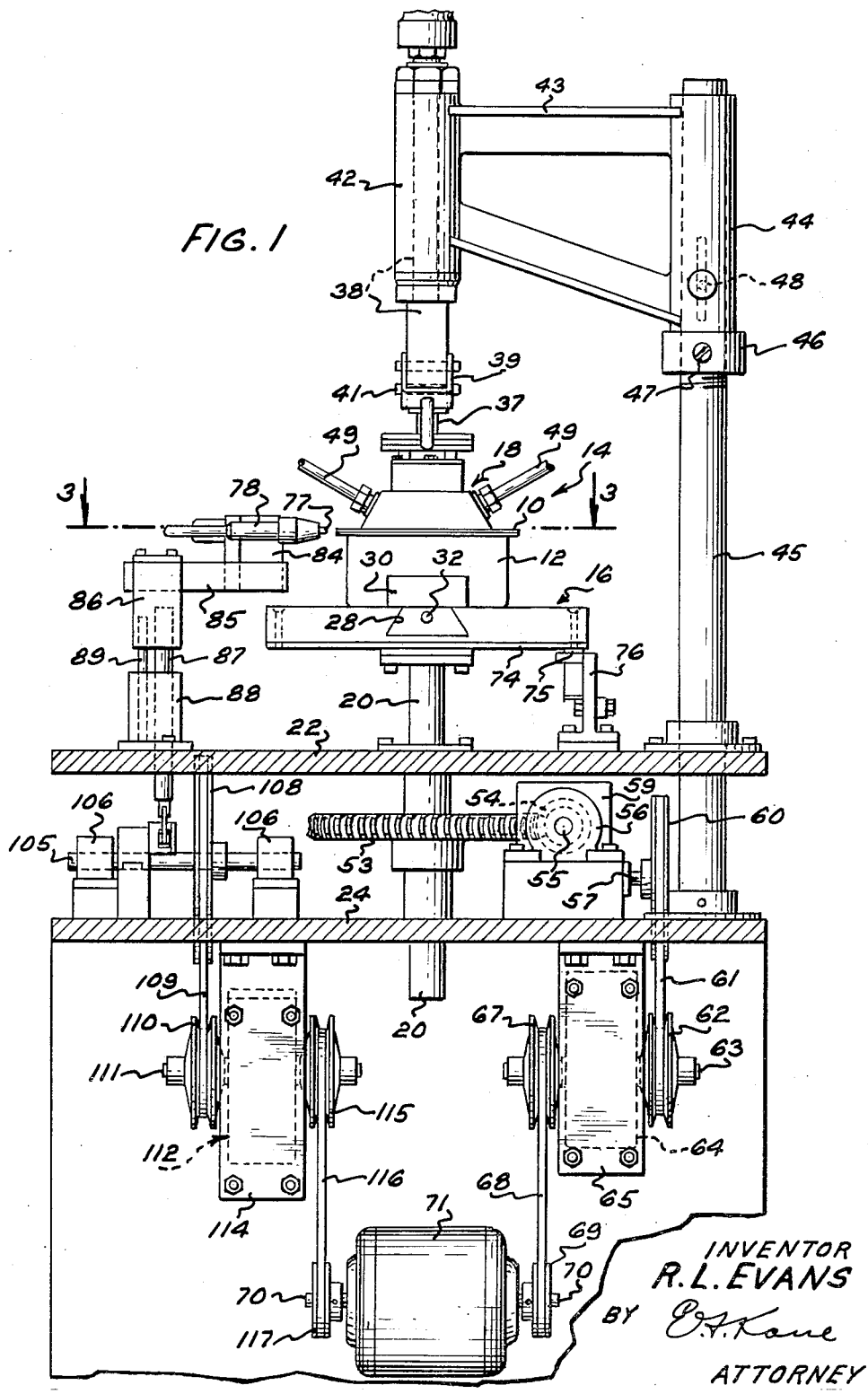
Figure 2:
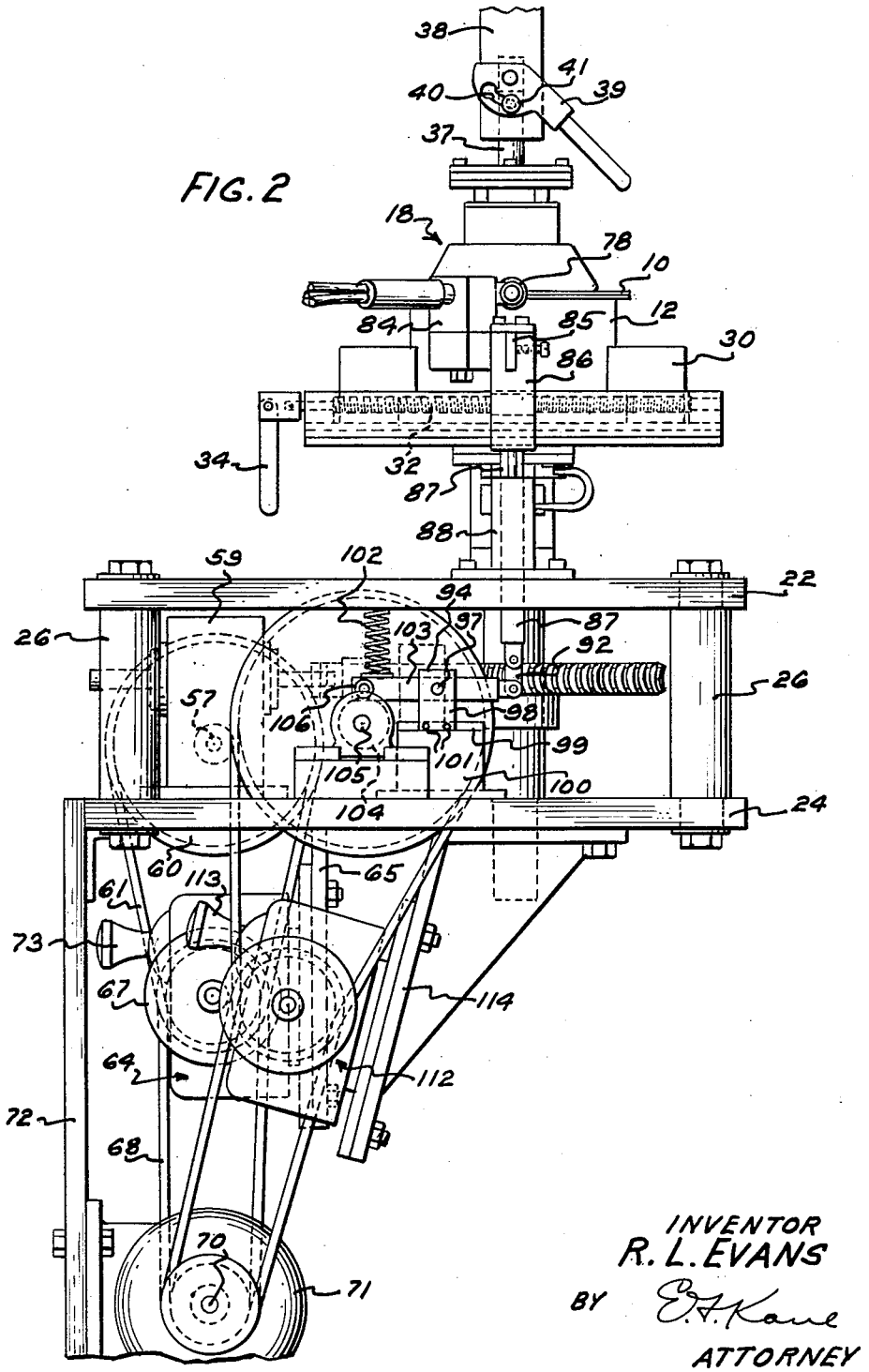
Fig. 2 is a side elevational view of the apparatus as viewed from the left of Fig. 1.
Figure 3:
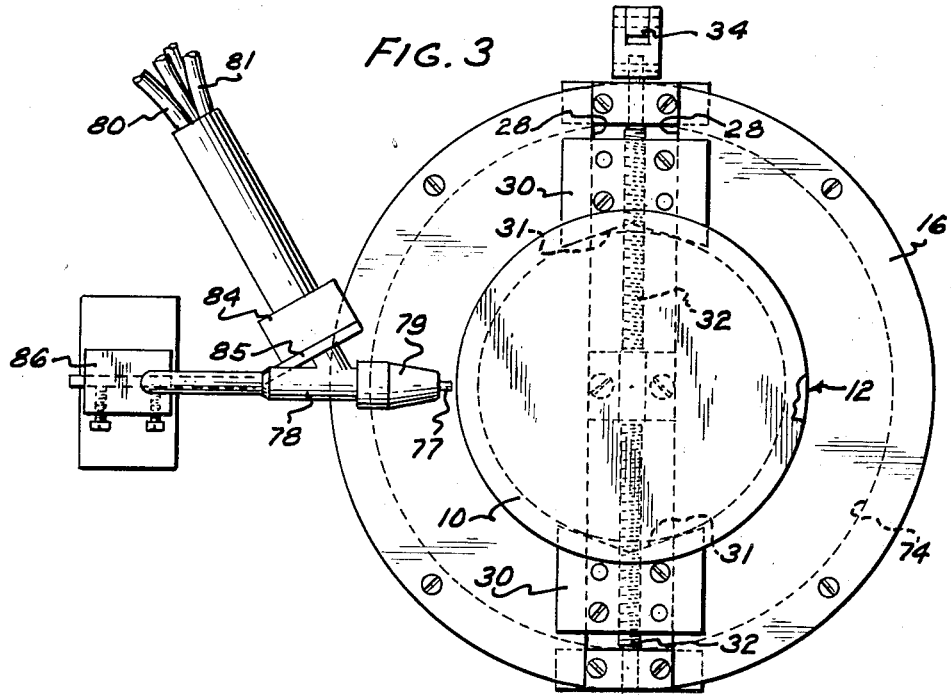
Fig. 3 is a plan sectional view taken on the line 3—3 of Fig. 1.

The machine selected to illustrate the preferred embodiment of the present invention is designed to weld a circular cover plate 10 to the flanged open end of a cylindrical container or housing member 12 to form a casing for enclosing a plurality of loading coils. The parts 10 and 12 are clamped in a rotatable holder 14 comprising a lower support or jaw member 16 mounted for rotation about a substantially vertical axis and an upper jaw or clamping member 18 mounted for limited vertical movement to permit the application and removal of the parts 10 and 12. The jaw 16 is fixed to the upper end of a shaft 20 which is rotatably mounted in bearings formed in a pair of horizontal plates or frame members 22—24 secured in spaced relation to each other by a plurality of spacer memebrs or posts 26—26 (Fig. 2) and supported by any suitable means.

Formed in the lower jaw or support 16 is a diametrically disposed guideway 28 in which are slidably mounted a pair of clamps or gripping members 30 having V-shaped inner faces 31—31 formed thereon for engagement with the cylindrical casing 12. An actuating rod 32 provided with left and right hand threads and suitably supported in the member 16 threadedly engages the gripping members 30, and is provided with a handle 34 by means of which the rod 32 may be rotated to move the gripping members 30 toward each other into gripping relation with the cylindrical casing 12 to centralize and clamp it in coaxial relation on the lower supporting jaw 16.

The upper jaw 18 is attached to the lower end of a rod 37 which is telescopingly mounted in the lower end of a shaft 38 and is adapted to be moved vertically through a limited distance by a lever 39 pivotally mounted on the shaft 38. Cam slots 40 formed in the lever 39 receive the end portions of a pin 41 fixed to the end of the rod 37 and extending horizontally therefrom through vertical slots in the shaft 38, and serve to raise and lower the jaw 18 in response to movement of the lever 39. The shaft 38 is rotatably supported in an elongated bearing member 42 of a bracket 43 which has another elongated bearing member 44 oscillatably mounted on the upper end of a supporting rod 45, which in turn is secured at its lower end to the horizontal frame plates 22 and 24. The lower end of the bearing member 44 of the bracket 43 rests on a collar 46 which threadedly engages a threaded portion of the rod 45 and is rotatable thereon for adjusting the bracket 43 and the jaw 18 vertically. A lock screw 47 in the collar 46 serves to lock the collar in adjusted position. The jaw 18 and the bracket 43 are oscillatable about the axis of the rod 45 to and from an operative position with the supporting shaft 38 of the jaw 18 in axial alignment with the shaft 20 of the lower jaw 16, and the bracket 43 is locked in operative position by a spring pressed pin or detent 48 engageable in a vertical groove in the supporting rod 45. The upper jaw 18 is hollow and has pipes 49 connected thereto through which a coolant is circulated to cool the jaw.

The holder 14 and the parts 10 and 12 are adapted to be rotated by a drive mechanism including a worm wheel 53 fixed to the shaft 20 intermediate the frame plates 22 and 24. The worm wheel 53 meshes with a worm 54 mounted on a shaft 55 and enclosed in a gear housing 56 which is supported on the frame plate 24. The shaft 55 is driven from a shaft 57 through a gear reducer enclosed in a housing 59 which is also mounted on the supporting plate 24. A pulley 60 fixed to the shaft 57 is driven by a V-belt 61 from a pulley 62 on one end of a shaft 63 of a suitable speed changing device 64 supported by a bracket 65 from the underneath side of the plate 24. A pulley 67 on the other end of the shaft 63 of the speed changer 64 is connected through a V-belt 68 to a pulley 69 on one end of a shaft 70 of a motor 71, which is mounted on a bracket 72 (Fig. 2) extending downwardly from the frame plate 24.

Although any suitable type of variable speed changing mechanism may be used, the speed changer 64 shown herein is of the type in which the shaft 63 is movable transversely to its axis under control of a lever 73 to vary the effective diameter of the pulleys 62 and 67 according to the setting of the lever 73. The pulleys are of two-part construction automatically adjustable axially to different positions by the V-belts engaging them in response to the setting of lever 73 to various positions. Thus with the motor rotating movement will be transmitted through the drive to the lower jaw 16 to cause the holder 14 and the parts 10 and 12 to be rotated about the axis of the shaft 20, and the rate of rotation of the holder and the parts 10 and 12 may be varied by varying the setting of the lever 73 of the speed changer 64.

Fixed to the lower side of the lower jaw 16 of the holder 14 is a metal ring 74 which is engaged by a brush 75 mounted in a brush holder 76, which is supported on and insulated from the upper frame plate 22. The brush 75 and the holder 14 and the parts 10 and 12 to be welded are connected to a suitable alternating current welding circuit. Also connectible to the welding circuit is a non-consumable electrode 77 which is disposed in a horizontal position adjacent the juncture of the parts 10 and 12. The electrode 77 is mounted in a hollow member 78 and has a sleeve 79 surrounding a portion thereof, through which an inert gas, such as helium or argon supplied through a line 80, flows to the adjacent portion of the parts 10 and 12, envelopes the electrode, and the arc produced between the electrode 77 and the parts during the welding operation. Coolant circulating through lines 81 serves to cool electrode 77 and member 78.

The electrode 77 and the member 78 are supported in a suitable holder comprising a block 84 fixed to a bar 85, which is adjustably secured to a member 86 and may be adjusted toward or away from the holder 14 to accurately position the electrode relative to the parts to be welded. The member 86 is secured to the upper end of a rod 87 slidably mounted in a guide member 88 secured to the upper frame plate 22, and has a guide pin 89 secured thereto and slidably engageable in an aperture in the member 88 to prevent rotation of the electrode holder.

At its lower end, the rod 87 is pivotally connected to one end of a link 92, the other end of which is connected to one end of a lever 93 which in turn is positioned in a slot in an adjustable fulcrum member 94 and adjustably clamped to the member by a plate 95 and clamping screws 96. The member 94 has a pintle 97 which extends outwardly horizontally therefrom and is journalled in a bearing member 98 for pivotally supporting the fulcrum member 94 and the lever 93 for rocking movement about the axis of the pintle 97. The bearing member 98 is adjustably mounted for horizontal movement on a guide rail 99 formed on the upper end of a supporting block 100 mounted on plate 24 and is secured in adjusted position by a pair of locking screws 101. A helical compression spring 102 interposed between one end of the lever 93 and the plate 22 serves to stress the lever 93 for rocking movement about the axis of the pintle 97 to raise the electrode 77. A cam 104 mounted on a cam shaft 105 engages a cam roller 106 on one end of the lever 93 and serves to rock the lever about the axis of the pintle 97 in the opposite direction and causes the electrode 77 to be moved downwardly.

The shaft 105 is journalled in bearing members 106—106 mounted on the plate 24 and a pulley 108 fixed to the shaft 105 is connected through a V-belt 109 to a drive pulley 110 on one end of a shaft 111 of a speed changer 112. The speed changer 112 is supported on a bracket 114 attached to the underneath side of the plate 24, and has a pulley 115 on the other end of the shaft 111 connected by a V-belt 116 and a pulley 117 to the other end of the motor shaft 70. Thus upon rotation of the motor 71, the cam shaft 105 is caused to rotate and the cam 104 thereon in cooperation with the compression spring 102 acts to oscillate the lever 93 and impart vertical reciprocation to the holder 78 and the electrode 77. By moving a lever 113 of the speed changer 112, which is similar in construction and operation to the speed changer 64, the drive ratio of the pulleys of the speed changer is varied to vary the frequency of the reciprocation of the electrode 77.

Figures 4, 5:
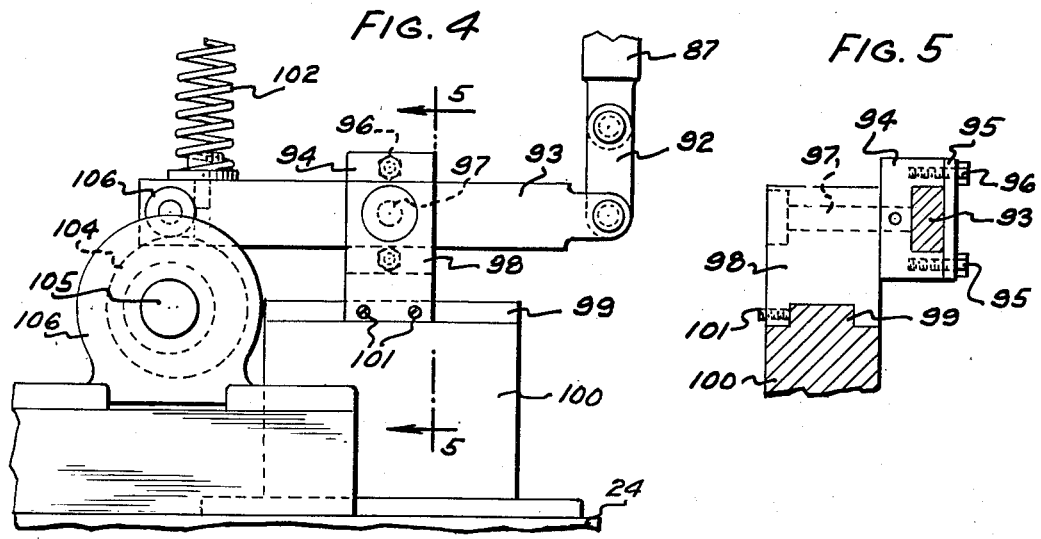
Fig. 4 is a detailed elevational view of a portion of the apparatus for reciprocating the electrode of the apparatus and Fig. 5 is a detailed vertical sectional view taken on the line 5—5 of Fig. 4.

By loosening the locking screws 96 and 101 (Figs. 4 and 5), the supporting members 94 and 98 may be moved horizontally relative to the lever 93 and the supporting member 100, respectively, to adjust the fulcrum of the lever 93 in order to vary the extent of reciprocation of the electrode 77.

In the operation of the device, assuming that the lever 39 has been moved upwardly to raise the upper clamp 18 and the bracket 43 has been swung to one side to render the lower jaw support 16 accessible, a cylindrical part 12 may be placed on the top surface of the support 16 and the handle 35 turned to rotate the threaded rod 32 and cause the gripping members 30 to move toward each other into engagement with the part 12 to centralize and clamp on the support 16 in coaxial alignment with the shaft 20. The cover plate 10 may then be positioned centrally on the part 12 and the bracket 43 may be turned to its operative position with the clamping member 18 in coaxial alignment with the shaft 20 and locked in its operative position by the detent plunger 48, after which the lever 39 may be lowered to cam the upper jaw 18 downwardly into engagement with the part 10 to clamp it firmly against the part 12. The motor 71 may then be connected to a source of power to cause the holder 16 to rotate and to cause the electrode 77 to reciprocate vertically relative to the parts 10 and 12. The welding circuit through the electrode 77 and the brush 50 may then be completed to cause an arc to be formed between the electrode 77 and the parts 10 and 12 as the parts are rotated. The edge portions of the parts 10 and 12, which are to be welded together, will be rotated through a predetermined path in horizontal spaced relation to the electrode 77, and the electrode 77 will be reciprocated across the line of juncture of the parts 10 and 12 alternately into close proximity to one and then the other of the parts to cause the arc to be drawn alternately from one and then the other of the parts to the electrode 77.

Thus with the reciprocation of the electrode 77 to insure that the arc is formed between the electrode, and alternate ones of the parts 10 and 12, successive portions of the edges of each of the parts 10 and 12 are fused, and pools of molten metal are formed thereon which pools unite to form a continuous weld between the parts.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an arc welding apparatus for welding two annular metal parts at their abutting annular edges, a combined base and electrode for supporting one of said parts and connecting it to a welding circuit, means for clamping the other of said parts in engagement with said one part, drive means for rotating said combined base and electrode to move the line of juncture of the two parts in a predetermined path, a welding electrode connected to said welding circuit, means for guiding said electrode for reciprocation adjacent the line of juncture of the parts on said base, and means operable in timed relation to said drive means for reciprocating said electrode across the line of juncture of said parts to alternately associate the electrode with the edge portions of each of said parts.

2. In an inert arc welding apparatus for welding covers on containers, a combined base and electrode for supporting the container having a cover on it and connecting it to a welding circuit, means for rotating said combined base and electrode to move the line of juncture of the container and the cover in a predetermined path, a non-consumable welding electrode, means for supporting said electrode adjacent a portion of the container on said base, means for directing a blanket of inert gas over said electrode and the edge portions of said container and cover adjacent said electrode, and means operable in timed relation to said means for rotating said base and to reciprocate said electrode across the juncture of the container and the cover to alternately associate said non-consumable electrode with the container and with the cover carried thereby.

3. In an arc welding apparatus for welding together the edge portions of two metal parts, the combination of a holder for supporting the parts with the edge portions to be welded in engagement with each other and for connecting said parts to a welding circuit, means supporting said holder and the parts thereon for movement to guide the edge portions of said parts through a predetermined path, an electrode disposed adjacent the path of movement of said edge portions of said parts and connected to said welding circuit whereby an arc may be formed between said electrode and said edge portions of said parts, means guiding said electrode for reciprocable movement across the juncture of said parts, drive means for advancing said holder to move the edge portions of said parts through said path, drive means for reciprocating said electrode alternately to move said electrode into close proximity to one and then the other of the edge portions of said parts as they are advanced through said predetermined path to draw an arc alternately from one and then the other of the edge portions of said parts.

4. An inert arc welding apparatus for welding together the edge portions of two metal parts, the combination of a holder for supporting the parts with the edge portions to be welded in engagement with each other and for connection of said parts to an alternating welding circuit, means supporting the holder and the parts thereon for movement to guide the edge portions of said parts through a predetermined path, an electrode disposed adjacent the path of movement of the edge portions of said parts and connected to said welding circuit whereby an arc may be formed between said electrode and the edge portions of said parts, means for directing a blanket of inert gas around said electrode and the edges of said parts adjacent said electrode, means guiding said electrode for reciprocable movement across the juncture of said parts, and drive means for advancing said holder to move the edge portions of said parts through said path and for reciprocating said electrode alternating to move said electrode into close proximity to one and then the other of said parts as they are advanced through said predetermined path to draw an arc alternately from one and then the other of the edge portions of said parts.

5. In an arc welding apparatus for welding the edge portions of two circular metal parts together, the combination of a rotatable holder for supporting said parts for rotation about a predetermined axis comprising a pair of clamping jaws mounted for rotation about said predetermined axis and for axial movement of one of said jaws relative to the other to clamp said parts therebetween, means on one of said jaws engageable with one of said parts for centralizing said parts in coaxial relation with said axis, drive means for rotating said holder, an electrode, means mounting said electrode for reciprocation adjacent the edge portion of said parts and parallel to the axis of rotation of said parts, means connecting said electrode and said holder to a welding circuit, and drive means for reciprocating said electrode.

6. In an arc welding apparatus for welding together the edge portions of two circular metal parts, the combination of a pair of clamping jaws mounted for rotation about a predetermined axis and for axial movement of one of said jaws relative to the other to clamp said parts therebetween, means on one of said jaws engageable with one of said parts for contralizing said parts in coaxial relation with said axis, an electrode, means supporting said electrode for reciprocation adjacent the edge portions of said parts, means connecting said electrode and said holder to a welding circuit, drive means including a speed changer for rotating said clamping jaws, a rotatable cam cooperating with said electrode supporting means for reciprocating said electrode, and drive means including a speed changer for rotating said cam to effect the reciprocation of said electrode.

7. In an inert arc welding apparatus for welding the edge portions of two circular metal parts, the combination of a rotatable holder for supporting said parts for rotation about a predetermined axis comprising a pair of clamping jaws mounted for rotation about said predetermined axis and for axial movement of one of said jaws relative to the other to clamp said parts therebetween, means on one of said jaws engageable with one of said parts for centralizing said parts in coaxial relation with said axis, a non-consumable electrode, means for directing a blanket of inert gas over said electrode and the adjacent edges of said parts, means connecting said electrode and said holder to an alternating current welding circuit, variable drive means for rotating said holder, variable drive means for reciprocating said electrode, and means for varying the extent of reciprocation of said electrode.

8. In an inert arc welding machine for welding together two circular parts, the combination of a rotatable support mounted for rotation about a predetermined axis, means on said support for centralizing one of said parts in coaxial alignment therewith, a rotatable clamping member mounted for rotation about and for axial movement along said predetermined axis for clamping said parts together against said support, a non-consumable electrode, means connecting said support and said electrode to an alternating current welding circuit, means guiding said electrode for reciprocation adjacent to the edge of the parts to be welded together and parallel to the axis of rotation of the parts, means for rotating said support, means for reciprocating said electrode, means for varying the rate of reciprocation of said electrode relative to the rate of rotation of said support, and means for directing a blanket of inert gas over the electrode and the edge portions of said parts adjacent said electrode.

9. In an inert arc welding apparatus for welding together the edge portions of two circular metal parts, the combination of a base, a pair of clamping jaws, means on said base for mounting said clamping jaws for rotation about a predetermined axis and for axial movement of one of said jaws relative to the other to clamp said parts therebetween, means on one of said jaws engageable with one of said parts for centralizing said parts in coaxial relation with said axis, a non-consumable electrode, a member for supporting said electrode, means on said base mounting said member for reciprocation to guide said electrode for reciprocating movement adjacent the edge portions of said parts, a lever pivotally connected at one end to said member, a cam follower mounted on the other end of said lever, fulcrum means adjustably secured to said lever intermediate its ends, adjustable means mounted on said base for supporting said fulcrum means and said lever for rocking movement, a rotatable cam engageable with said cam follower, drive means including a speed changer for rotating said cam, drive means including a speed changer for rotating said clamping jaws, means connecting said electrode and one of said jaws to an alternating current welding circuit, and means for directing an inert gas over said electrode and the adjacent edge portions of said parts.

10. An inert arc welding apparatus for welding a circular cover plate to a cylindrical container comprising a base, a pair of clamping jaws, means on said base for mounting said clamping jaws for rotation about a predetermined axis and for axial movement of one of said jaws relative to the other to clamp the cover onto said container, means on one of said jaws engageable with the periphery of said container for centralizing said container in coaxial relation with said axis, a non-consumable electrode, a member for supporting said electrode adjacent the edge portions of said container and cover parts, means on said base for guiding said member and electrode for reciprocable movement across the seam of the container and cover plate to be welded, a cam lever pivotally connected to said member, means on said base mounting said lever for oscillatable movement, a rotatable cam for oscillating said cam lever, a motor, drive means including a speed changing unit driven from said motor for rotating said cam, drive means including a second speed changing unit driven from said motor for rotating said jaws, means connecting said electrode and one of said jaws to an alternating current welding circuit, and means for directing an inert gas over said electrode and the adjacent edge portions of said cover and container parts.

11. In an inert arc welding apparatus for welding a circular cover plate to a cylindrical container, the combination of a base, a pair of clamping jaws, means on said base for mounting said clamping jaws for rotation about a predetermined axis and for axial movement of one of said jaws relative to the other to clamp the cover onto the container, means on one of said jaws engageable with the periphery of said container for centralizing said container in coaxial relation with said axis, a non-consumable electrode, a holder for supporting said electrode adjacent the edge portions of said container and cover parts, means on said base for guiding said holder and electrode for reciprocable movement parallel to the axis of rotation of the clamping jaws, a lever pivotally connected at one end to said holder, a cam follower mounted on the other end of said lever, fulcrum means adjustably secured to said lever intermediate its ends, means mounted on said base for adjustably supporting said fulcrum means and said lever for rocking movement, a rotatable cam engageable with said cam follower, a motor, drive means including a first speed changer driven from said motor for rotating said cam, drive means including a second speed changer driven from said motor for rotating said jaws, means connecting said electrode and one of said jaws to an alternating current welding circuit, and means for directing an inert gas over said electrode and the adjacent edge portions of said cover and container parts.

ROBERT L. EVANS.

REFERENCES CITED

The following references are of record in the file of this patent:

UNITED STATES PATENTS

| Number | Name | Date |
| --- | --- | --- |
| 1,238,257 | Butler | Aug. 28, 1917 |
| 1,550,651 | Charter | Aug. 18, 1925 |
| 1,667,585 | Chapman | Apr. 24, 1928 |
| 1,784,015 | Lane et al. | Dec. 9, 1930 |
| 1,933,340 | Raymond | Oct. 31, 1933 |
| 2,063,467 | Southgate | Dec. 8, 1936 |
| 2,254,792 | Brown | Sept. 2, 1941 |
| 2,267,296 | Bennewitz et al. | Dec. 23, 1941 |
| 2,472,323 | Welch, Jr. | June 7, 1949 |